United States Patent [19]
June

[11] Patent Number: 5,642,792
[45] Date of Patent: Jul. 1, 1997

[54] HIGHWAY CRASH CUSHION

[75] Inventor: David L. June, Sutter, Calif.

[73] Assignee: Energy Absorption Systems, Inc., Chicago, Ill.

[21] Appl. No.: 614,336

[22] Filed: Mar. 12, 1996

[51] Int. Cl.[6] .................................................. F16F 7/12
[52] U.S. Cl. .................. 188/377; 267/139; 256/13.1; 404/10
[58] Field of Search ......................... 188/377, 371; 267/139; 256/13.1; 404/6, 10

[56] References Cited

U.S. PATENT DOCUMENTS

| | | | |
|---|---|---|---|
| 1,445,655 | 2/1923 | Anderson et al. | |
| 1,466,115 | 8/1923 | Butsch et al. | |
| 2,058,283 | 10/1936 | Wolff | 293/55 |
| 3,385,564 | 5/1968 | Persicke | 256/13.1 |
| 3,751,089 | 8/1973 | Lefeuvre | 293/1 |
| 3,972,390 | 8/1976 | Melton et al. | 188/377 |
| 4,047,701 | 9/1977 | Glaesener | 256/13.1 |
| 4,452,431 | 6/1984 | Stephens et al. | 404/6 X |
| 4,711,481 | 12/1987 | Krage et al. | 293/133 |
| 4,770,420 | 9/1988 | Gottwald et al. | 293/104 |

FOREIGN PATENT DOCUMENTS

| | | |
|---|---|---|
| 2125990 | 9/1972 | France . |
| 2528928 | 6/1982 | France . |
| 4037101A1 | 11/1990 | Germany . |
| 607636 | 8/1960 | Italy . |
| WO90/14972 | 12/1990 | WIPO . |

*Primary Examiner*—Peter M. Poon
*Attorney, Agent, or Firm*—Brinks Hofer Gilson & Lione

[57] ABSTRACT

A support frame attaches a truck mounted attenuator to a backup vehicle. The support frame includes a rear section connected to a front section by a linkage which includes two spaced side frames. The side frames each include three hinges, with the intermediate hinge arranged to fold outwardly in an impact. The hinges pivot about vertical hinge axes such that the front section is supported during pivoting of the hinges. The support frame is held in an initial configuration by restraining cables connected between the linkage and the front section. The cables are releasably secured to the front section by a trigger mechanism which is activated by the position of a probe mounted to the TMA.

15 Claims, 8 Drawing Sheets

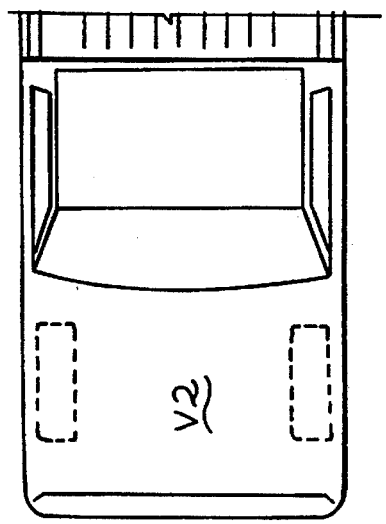
Fig. 1
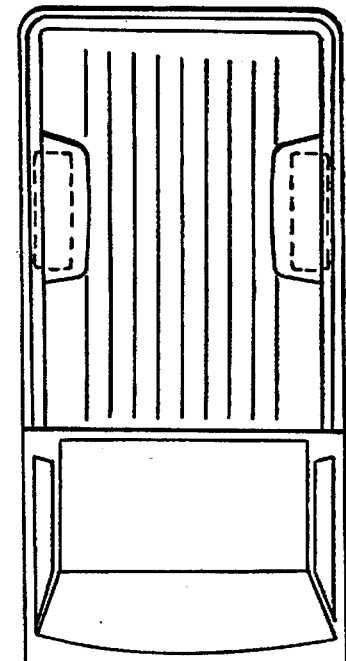
Fig. 2
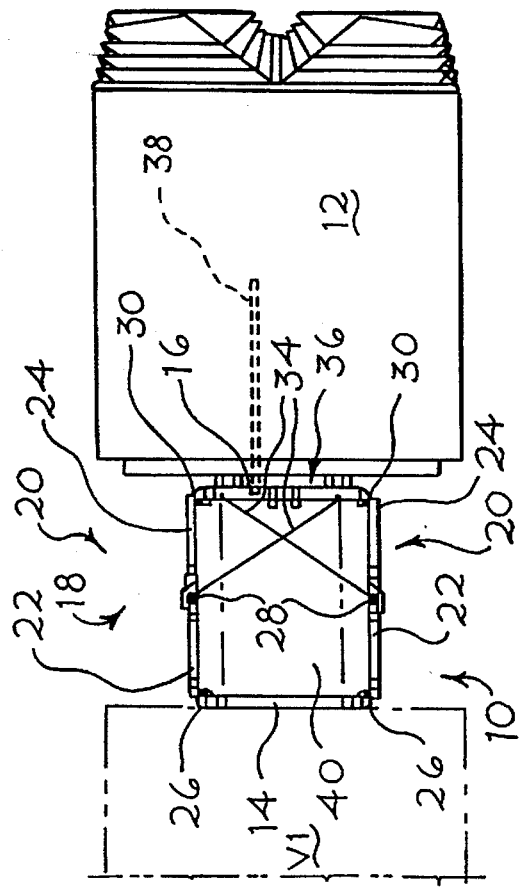
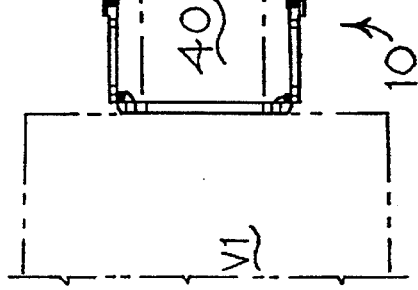

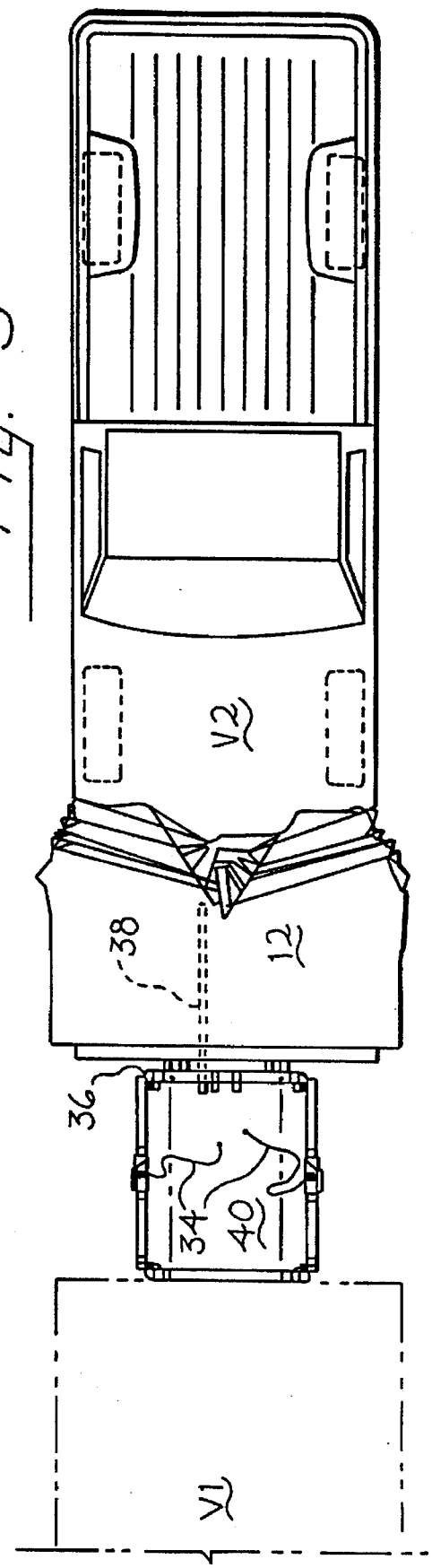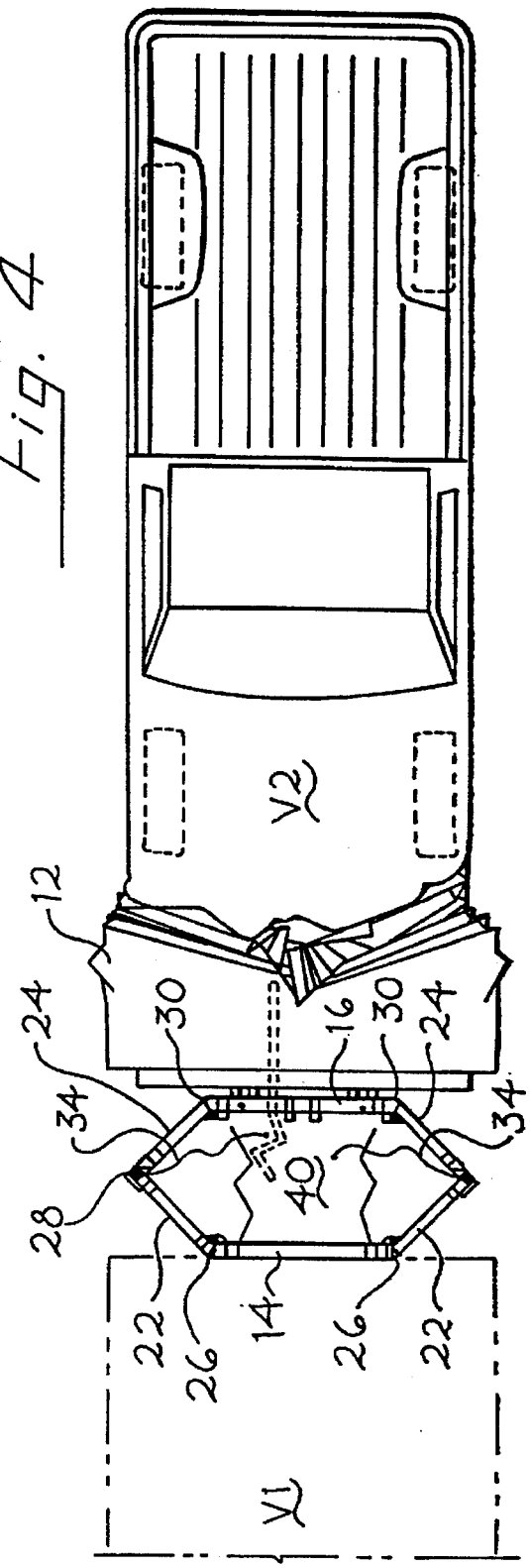

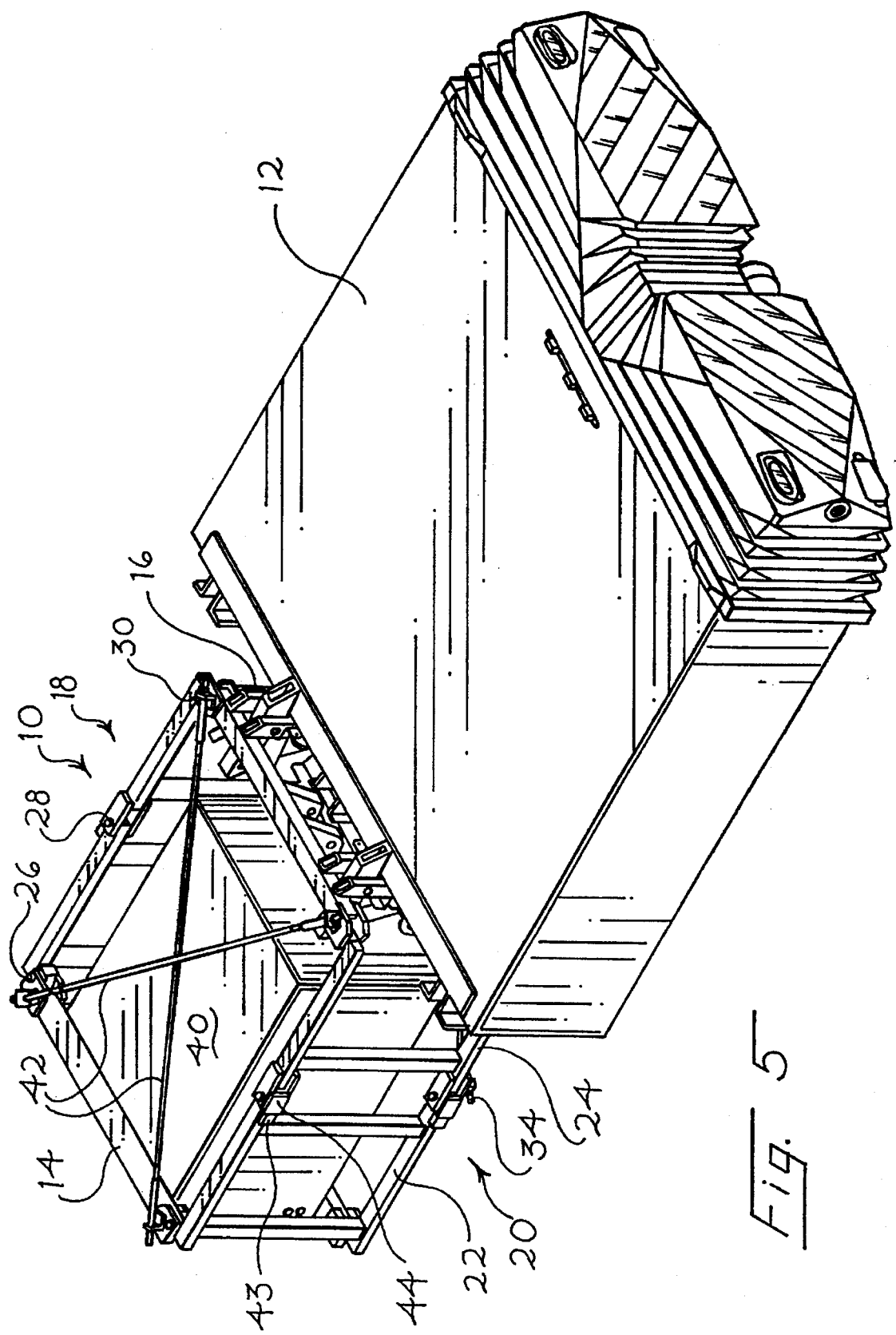

HIGHWAY CRASH CUSHION

BACKGROUND OF THE INVENTION

The present invention is directed to a highway crash cushion such as an energy absorbing support frame for a vehicle mounted attenuator.

Vehicle mounted attenuators (so called truck mounted attenuators or TMAs) are currently in widespread use. U.S. Pat. Nos. 4,711,481 and 5,199,755, assigned to the assignee of this invention, describe several such TMAs. In each case, the TMA is designed to be mounted on a vehicle such as a truck, which is then positioned adjacent to a region to be protected, such as a work zone alongside a highway. A vehicle which leaves an adjacent lane of traffic will be prevented from entering the work zone when it hits the TMA. The TMA decelerates the impacting vehicle in a controlled manner and reduces damage to the vehicle and injury to the occupants of the vehicle.

One problem in TMA design is that the device should operate reliably both in stopping lightweight vehicles travelling at relatively slow speeds (a low-energy event) and heavy vehicles travelling at high speeds (a high-energy event). In order to expand the energy absorbing range of TMAs, support frames of various types have been developed, including those described in U.S. Pat. Nos. 5,248,129 and 5,403,113, assigned to the assignee of this invention. These support frames are interposed between the TMA and the vehicle, and they provide an additional level of energy absorption capacity for high-energy events.

The support frame shown in U.S. Pat. No. 5,248,129 has been found to operate successfully in actual use. However, this support frame suffers from two disadvantages. First, the support frame is arranged about horizontal hinge axes, and after the support frame begins to collapse it provides little or no vertical support to the TMA. This is generally not a problem, because the impact occurs over such a short period of time that the TMA does not have time to move vertically in a disadvantageous manner. Nevertheless, this arrangement of the hinge axes leaves the TMA vulnerable to damage, in the event the support frame inadvertently collapses due to a failure of the restraining cables.

Second, the support frame shown in U.S. Pat. No. 5,248,129 relies on breakaway fasteners to hold the support frame in the initial configuration. When the compressive loads on the support frame exceed a predetermined level, these breakaway fasteners part, thereby allowing the support frame to begin to collapse. It can be expensive to obtain and maintain breakaway fasteners that operate with the desired degree of precision and reliability. Furthermore, a breakaway system that responds to the magnitude of the collapsing force may in some cases allow the support frame to collapse prematurely, in a low-energy event. In this case maintenance costs for the support frame can be unnecessarily high.

The present invention is directed to improvements which substantially overcome the disadvantages discussed above.

SUMMARY OF THE INVENTION

According to a first aspect of this invention, a highway crash cushion comprising a rear section adapted for mounting to a high-resistance object and a front section facing an anticipated direction of impact along an impact axis is provided with a linkage mounted between the front and rear sections. This linkage comprises two side frames, and each side frame comprises at least one hinge. The hinges are pivotable about respective hinge axes, and these hinge axes are oriented when the crash cushion is in a use orientation such that the front section is supported by the linkage as the hinges pivot. An energy-absorbing, deformable element is mounted between the side frames and is interposed between the front and rear sections. This energy-absorbing element is compressed between the front and rear sections as the hinges pivot in a high energy event to decelerate the front section.

According to a second aspect of this invention, a highway crash cushion comprising a front and rear section as described above includes a linkage mounted between the front and rear sections. This linkage is collapsible from an initial configuration to allow the front section to approach the rear section in an impact. A restraint device is coupled to the linkage to hold the linkage in the initial configuration. This restraint device comprises a trigger mechanism responsive to position of a probe to release the linkage from the initial configuration in response to movement of the probe in an impact.

The highway crash cushion of this invention can be adapted for use as a support frame for a vehicle mounted attenuator. In this case, the first aspect of the invention insures that the vehicle mounted attenuator is supported vertically as the support frame collapses and the hinges pivot. The second aspect of this invention insures that the support frame does not collapse until after the probe has moved an appropriate amount. Thus, collapse of the support frame is triggered by collapsing motion of the TMA in this example, rather than by impact forces.

The invention itself, together with further objects and attendant advantages, will best be understood by reference to the following detailed description, taken in conjunction with the accompanying drawings.

BRIEF DESCRIPTION OF THE DRAWINGS

FIGS. 1–4 are plan views of a first preferred embodiment of the highway crash cushion of this invention during four successive stages of a high-energy impact.

FIG. 5 is a perspective view of the embodiment of FIG. 1.

DETAILED DESCRIPTION OF THE PRESENTLY PREFERRED EMBODIMENTS

Figure 6:
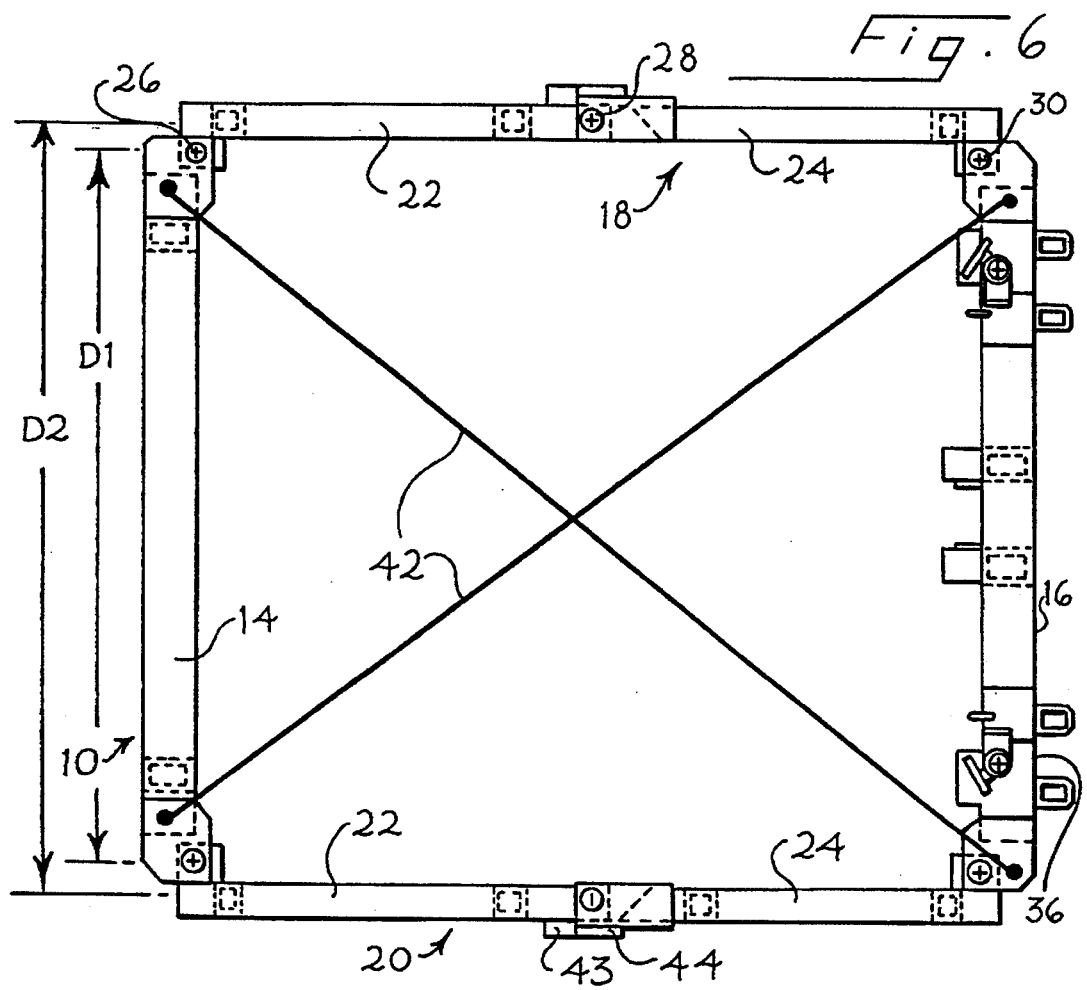
FIG. 6 is a top view of the embodiment of FIG. 1.

Turning now to the drawings, FIGS. 1–4 are top views showing the operation of a support frame 10 which incorporates a presently preferred embodiment of this invention, and FIG. 5 is a perspective view of the support frame 10. FIGS. 1–5 will be used to provide a general overview of the structure and operation of the support frame 10. The following figures will then be used to provide further details of structure and operation of the support frame 10.

As shown in FIG. 1, the support frame 10 mounts a crash attenuator such as a truck mounted attenuator (TMA) 12 to a backup vehicle V1 such as a heavy truck. As best seen in FIG. 5, the support frame 10 includes a rear section 14 which is adapted for mounting to the backup vehicle V1 and a front section 16 which is adapted for mounting to the TMA 12. The front and rear sections 14, 16 are interconnected by an articulating linkage 18. The backup vehicle V1 acts as a high resistance object that tends to hold the rear section 14 in place during an impact.

The linkage 18 in this embodiment includes two side frames 20. Each of the side frames 20 includes a rear subframe 22 and a front subframe 24. Each rear subframe 22 is pivotably connected to the rear section 14 by a respective rear hinge 26, and each front subframe is pivotably connected to the respective rear subframe 22 by an intermediate hinge 28. Each front subframe 24 is pivotably connected to the front section 16 by a front hinge 30. All of the hinges 26, 28, 30 pivot about respective hinge axes that are parallel to one another and substantially vertical (i.e. perpendicular to the plane of FIG. 1) when the support frame 10 is in a use configuration.

The support frame 10 is held in an initial configuration as shown in FIG. 1 by a restraint device which in this embodiment includes two diagonal cables 34. Each of the cables 34 has a rear end connected adjacent to a respective one of the intermediate hinges 28 and a front end connected to a trigger mechanism 36. The trigger mechanism 36 will be described in complete detail in conjunction with the following figures. Here, it is enough to state that the trigger mechanism 36 is responsive to the position of an axially extending probe 38. The probe 38 is a rigid rod which has a forward end fixed at an intermediate portion of the TMA 12 and a rearward end adjacent the trigger mechanism 36.

The support 10 also includes an energy-absorbing element 40 which is mounted between the side frames 20 so as to resist collapse of the support frame 10. In particular, the front section 16 cannot approach the rear section 14 in an impact event without crushing the energy absorbing element 40.

FIG. 1 shows the support frame 10 prior to impact.

FIG. 2 shows the support frame 10 at an early stage in a high-energy impact. Note that the impacting vehicle V2 has crushed the forward portion of the TMA 12. However, the rearward portion of the TMA 12 has not yet been distorted substantially, and the probe 38 remains in its initial position. For this reason the probe 38 has not contacted the trigger mechanism 36 in FIG. 2, and the support frame 10 remains in its initial configuration.

FIG. 3 shows a subsequent stage in the impact. At this point the impacting vehicle V2 has deformed the TMA 12 so substantially as to move the probe 38 rearwardly. This causes the probe 38 to activate the trigger mechanism 36 to release the cables FIG. 4 shows a later stage in the impact event. Once the cables 34 have been released by the trigger mechanism 36, the intermediate hinges 28 move away from one another and the subframes 22, 24 fold outwardly in the manner of a bifold door. Once the hinges 26, 28, 30 begin to pivot away from the position of FIGS. 1–3 toward the position of FIG. 4, the support frame 10 loses axial rigidity. The force of the impact then moves the front section 16 toward the rear section 14, deforming the energy absorbing element 40. Thus, it is only in the later stages of a high energy impact that the energy absorbing element 40 is crushed. In a low-energy impact the TMA 12 is not distorted beyond the configuration shown in FIG. 2, and the support frame 10 remains in its initial configuration for reuse.

Figure 7:
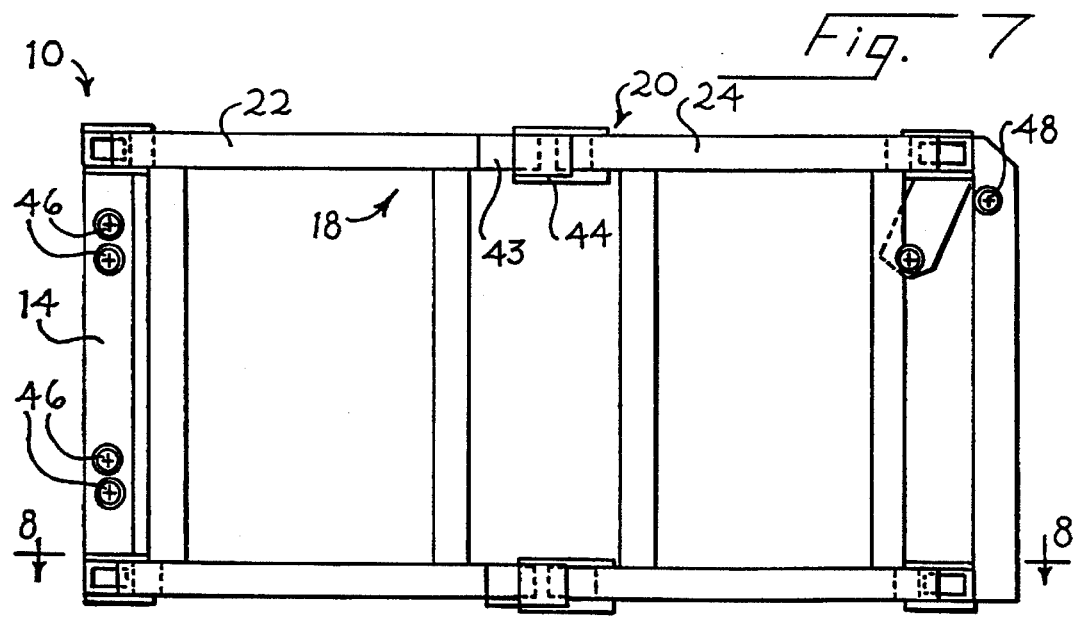
FIG. 7 is a side view of the embodiment of FIG. 1.
Figure 8:
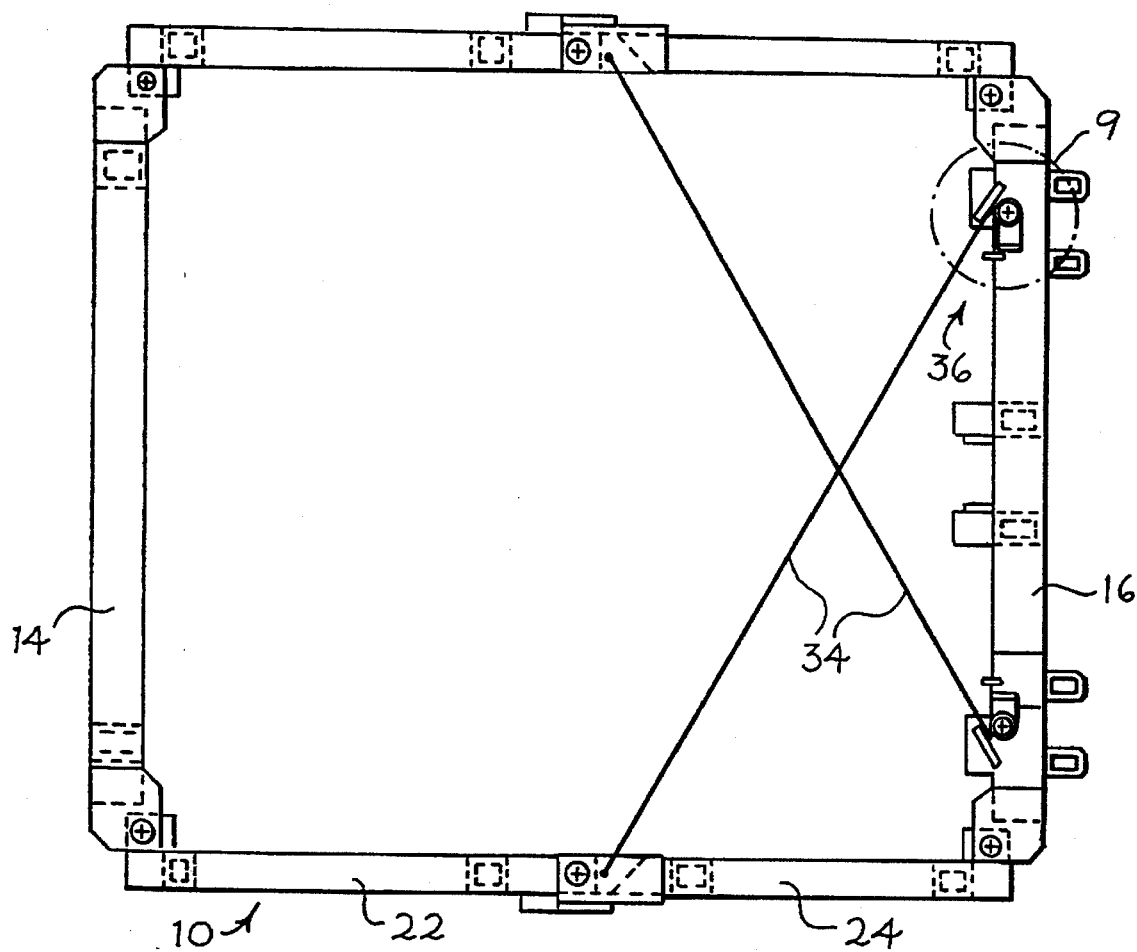
FIG. 8 is a cross-sectional view taken along line 8—8 of FIG. 7.

Turning now to FIGS. 6–8, these figures provide further details of construction for the support frame 10. FIG. 6 is a top view at an expanded scale. A number of features have been provided to increase the rigidity of the support frame 10 in its initial configuration and to ensure that the subframes 22, 24 fold outwardly when the support frame 10 collapses. First, the top cables 42 are arranged diagonally between front and rear corners of the support frame 10. These top cables 42 do not interfere with collapse of the support frame 10, because they are not connected to the linkage 18. Nevertheless, they provide increased rigidity to the support frame 10 in the initial configuration.

Second, the hinge axes for the rear hinges 26 are separated by a first distance D1 while the hinge axes for the intermediate hinges 28 are separated by a second distance D2, and D2 is greater than D1. This results in an offset in the hinge axes which causes the subframes 22, 24 to fold outwardly in a collapse. In order further to ensure this desired result, the subframes 22, 24 are provided with abutting surfaces 43, 44 which substantially prevent the side subframes 22, 24 from folding inwardly, and prevent the hinge axes for the intermediate hinges 28 from moving closer to one another than the initial configuration shown in FIG. 6.

The side view of FIG. 7 shows additional details of construction for the side frame 20. Attachment points 46 in the rear section 14 are adapted to attach the support frame 10 to the backup vehicle V1. The attachment point 48 adapts the front section 16 to mount the TMA 12, as described in greater detail below.

FIG. 8 is a cross-section view that shows the location of the cables 34, along with selected details of construction for the presently preferred trigger mechanism 36.

Figure 9:
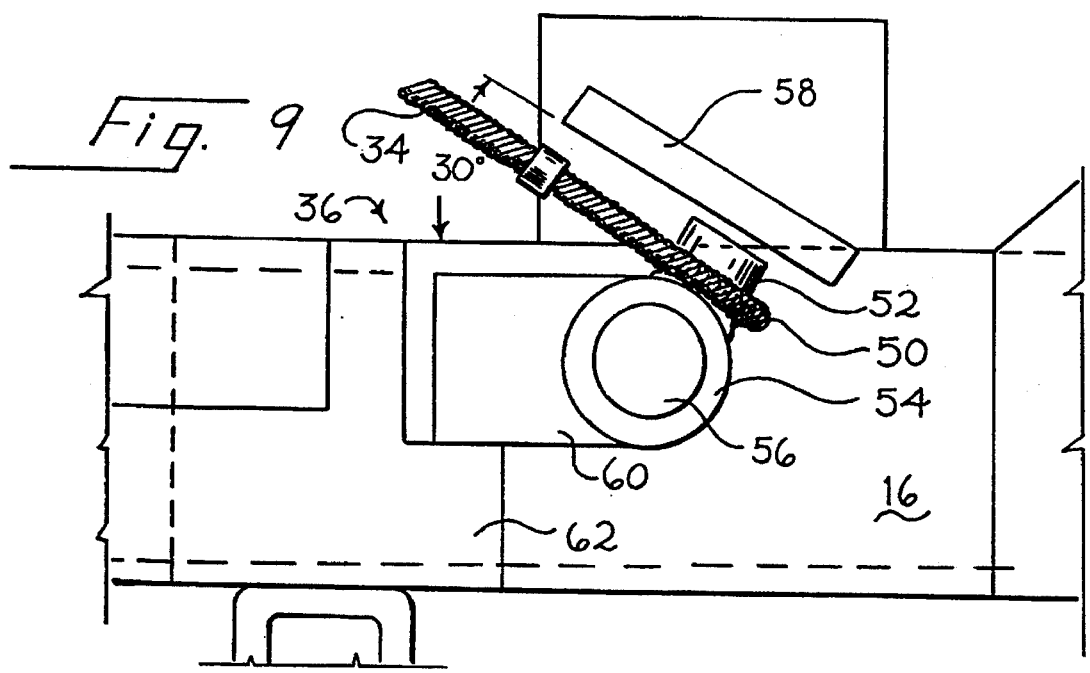
FIG. 9 is an enlarged plan view of the region 9 of FIG. 8.

FIG. 9 shows an enlarged top view of a portion of the trigger mechanism 36. In FIG. 9 the forward end 50 of one of the cables 34 forms an eye which is positioned around a cable anchor 52. The cable anchor 52 is rigidly mounted to a sleeve 54, and the sleeve 54 is mounted to the front section 16 for rotation about a vertically oriented post 56. A backup plate 58 prevents the cable end 50 from slipping off of the anchor 52 when the anchor 52 is in the position of FIG. 9.

The sleeve 54 also rigidly supports a tab 60 such that the tab 60, the sleeve 54 and the anchor 52 rotate as a unit about the post 56. The rotational position of the sleeve 54 is controlled by a plate 62 which operates as a sear. When the plate 62 is in the position shown in FIG. 9, the plate 62 engages the tab 60 to prevent rotation of the sleeve 54 and to hold the anchor 52 in the restraint position shown in FIG. 9. When the plate 62 is lifted by the actuator described below in conjunction with FIGS. 10–12, the plate 62 moves out of engagement with the tab 60, and tension on the cable 34 rotates the anchor 52 about the post 56 sufficiently to free the cable 34 from the anchor 52.

Figure 10:
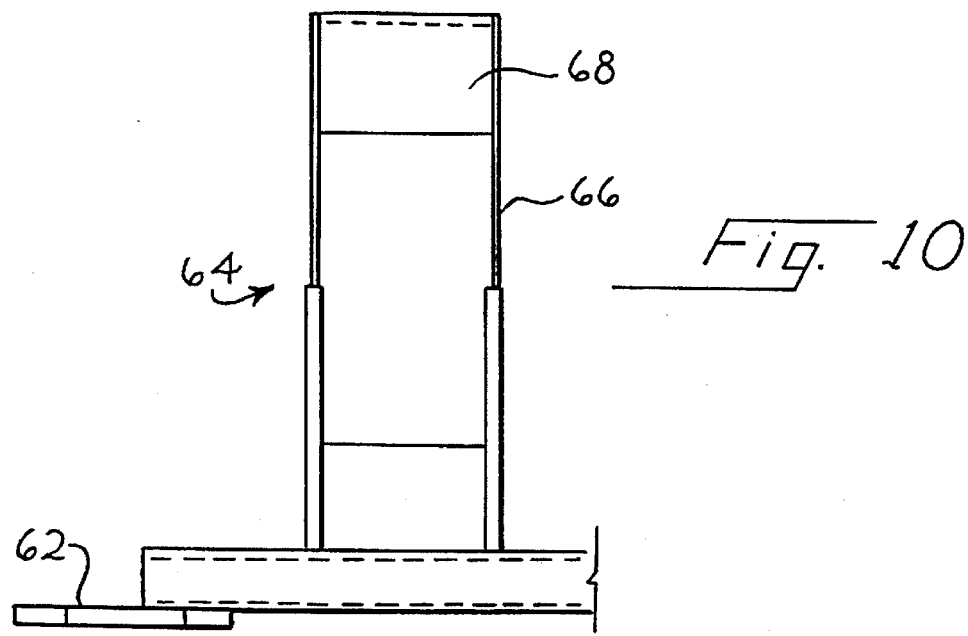
FIG. 10 is a front view of a portion of the trigger mechanism of the embodiment of FIG. 1.

FIG. 10 shows a front view of an actuator 64 that is connected at each end to one of the plates 62. The actuator 64 includes a central upstanding element 66 that terminates in an actuator surface 68.

Figure 11:
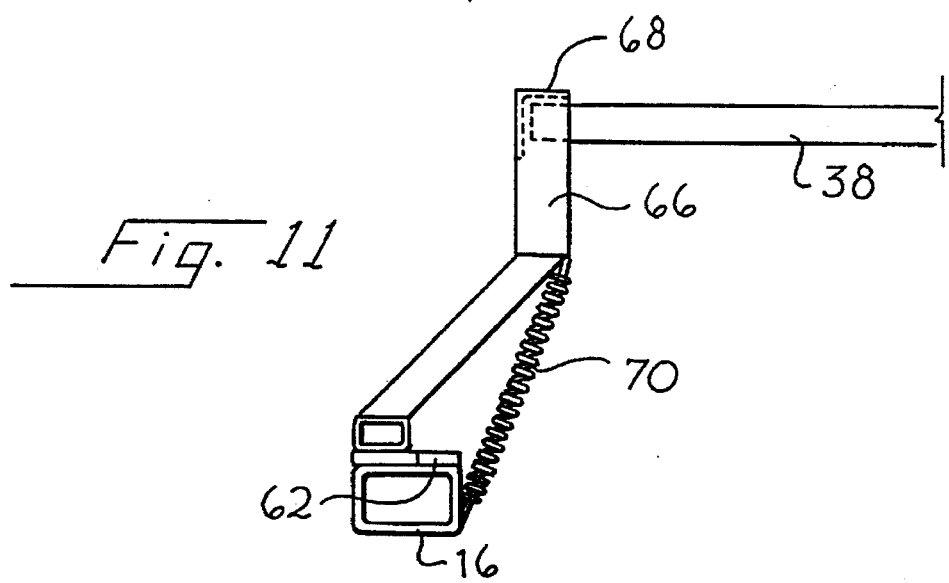
FIGS. 11 and 12 are side views of portions of the trigger mechanism of the embodiment of FIG. 1.
Figure 12:
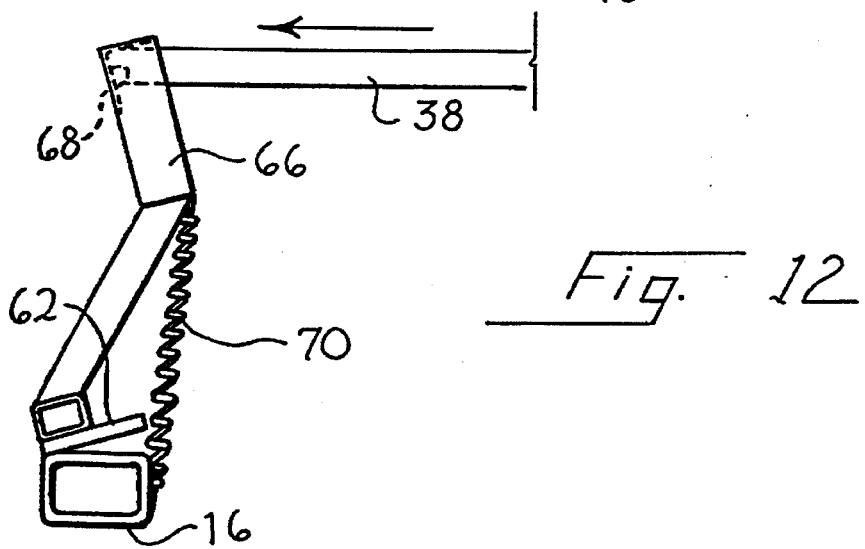

As best shown in FIGS. 11 and 12, a spring 70 tends to hold the element 66 in the position shown in FIG. 11. In this position the plates 62 are in firm engagement with the tabs 60, and the cables 34 are securely anchored in place to the front section 16 (FIG. 9). As shown in FIGS. 11 and 12, the probe 38 is positioned to engage the actuator surface 68. When the probe 38 moves rearwardly as shown in FIG. 12, the plates 62 are rotated upwardly. When the plates 62 are rotated to provide approximately ⅜" clearance, the plates 62 move out of engagement with the tabs 60, and allow rotation of the cable anchors 52 as described above.

Figure 13:
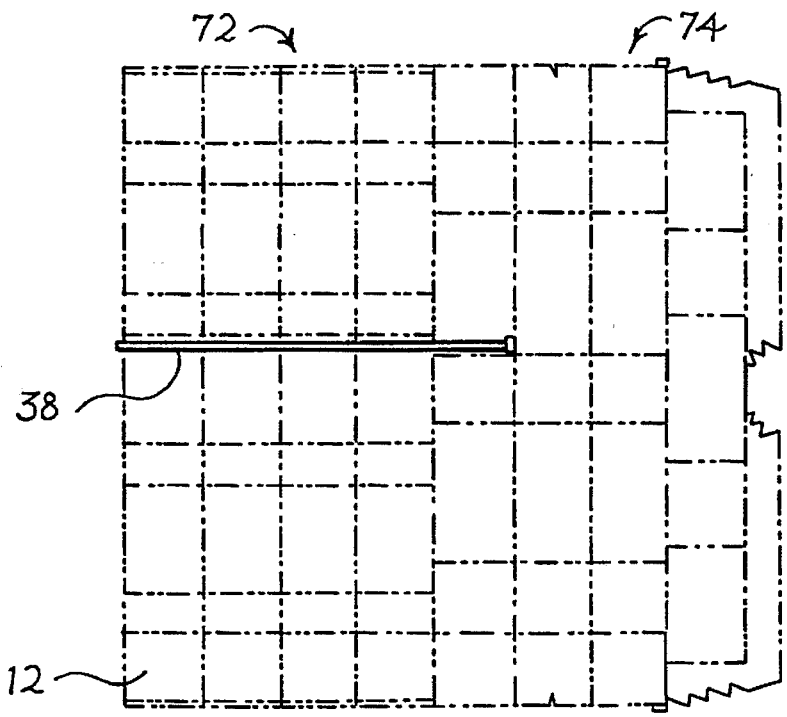
FIG. 13 is a partially schematic top view of a TMA used with the embodiment of FIG. 1.

FIG. 13 shows a top, schematic view of the TMA 12. This TMA 12 can be of the type described in U.S. Pat. No. 5,199,755, assigned to the assignee of this invention. As described in greater detail in that patent, the TMA 12 has a rearward first section 72 and forward second section 74. The first section 72 is intentionally made more rigid than the second section 74 such that in an impact it is the second section 74 that deforms first. This result can be achieved by varying the density or the compressibility of energy absorbing elements between adjacent diaphragms 76, as described in detail in that patent.

As shown in FIG. 13, the probe 38 has a forward end that is secured to a diaphragm that is behind to the second section 74. In this way, motion of the probe 38 is prevented during an initial stage of an impact, when deformation in the TMA 12 is limited to the second section 74. Preferably, the energy absorption capacity of the TMA 12 is greater than 530 KJ.

Figure 14:
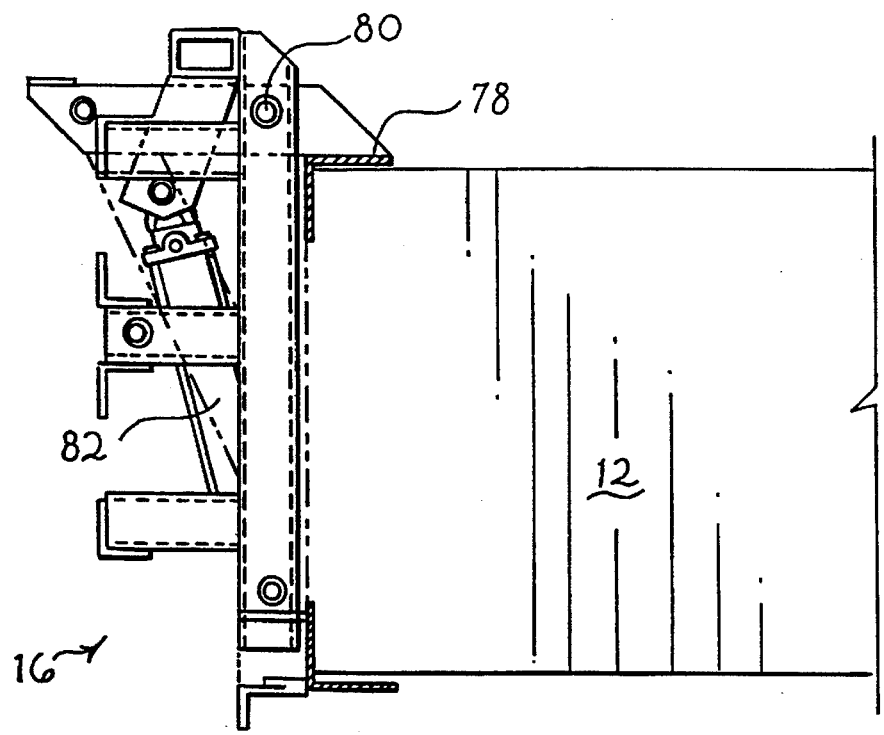
FIGS. 14 and 15 are fragmentary side views of a tilt mechanism included in the front portion of the embodiment of FIG. 1.
Figure 15:
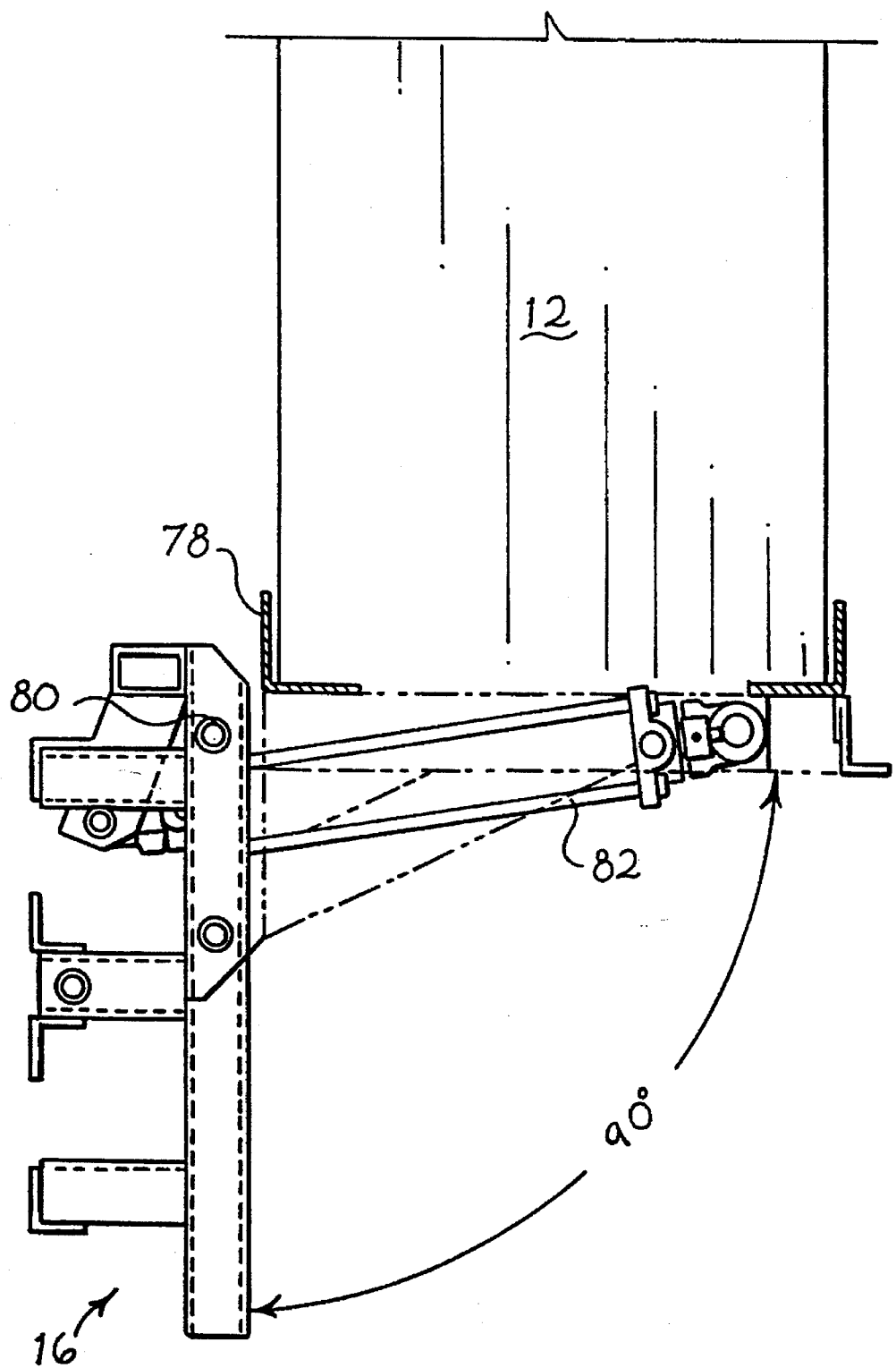

FIGS. 14 and 15 provide further details of construction regarding the front section 16 and the attachment of the front section 16 to the TMA 12. As shown in FIGS. 14 and 15, the TMA 12 includes an attachment frame 78 which is pivotably mounted to the front section 16 to pivot about a pivot axis 80. An actuator 82 such as a hydraulic cylinder is mounted between the front section 16 and the attachment frame 78 as shown in FIGS. 14 and 15. When this actuator 82 is in the collapsed position, the TMA 12 is positioned in the horizontal use position. When the actuator 82 is extended, the TMA 12 is tilted to the vertical storage position. This vertical storage position is useful for transporting the TMA 12 while attached to the backup vehicle V1.

The energy absorbing element 40 can take many forms, depending upon the application. The general purpose of the energy absorbing element 40 is to absorb kinetic energy as the front section 16 moves toward the rear section 14 in an impact. In this preferred embodiment the energy absorbing element 40 is formed of a sheet metal construction such as the high density energy absorbing portion associated with the rear bays 30 of the device described and shown in FIGS. 2 and 7 of U.S. Pat. No. 5,494,371, assigned to the assignee of this invention. In this preferred embodiment the energy absorbing element 40 has an energy absorption capacity of at least 181 KJ.

Simply by way of illustration the following further details of construction are provided. Of course, these details are not intended to be limiting. The subframes 22, 24 can be welded of rectangular section steel tube of 2×2×¼ inch. Rectangular steel tubing of 3×2×¼ inch can be used for the rear section 14 and rectangular steel tubing of 2½×1½×¼ inch can be used for the front section 16. The probe 38 can be formed of electrical conduit.

Of course, it should be understood that a wide range of changes and modifications can be made to the preferred embodiment described above. First, this invention is not limited for use as a support frame, but can be adapted for other types of highway crash cushions, including those that are fixedly mounted alongside a highway and those which do not support a TMA. The probe can take many forms, depending on the application. The side frames 20 can be formed as rails rather than panels, and if formed as panels can be closed rather than open framed as shown. The trigger mechanism can take many forms depending upon the application, and the sear can slide rather than rotate in some forms. Proportions, shapes and hinging geometries can all be adapted as appropriate for the particular application. Any suitable device can be used for the energy absorbing element 40.

Although the preferred embodiment described above embodies both aspects of this invention, it should be understood that they do not have to be used together. Thus, the trigger mechanism can be used in a linkage having either horizontal or vertical axes. Furthermore, the trigger mechanism is not limited to use with restraining cables as described above. Other types of restraining devices can be used, and the trigger mechanism can be modified appropriately.

It is therefore intended that the foregoing detailed description be regarded as illustrative rather than limiting, and that it be understood that it is the following claims, including all equivalents, which are intended to define the scope of this invention.

I claim:

1. In a highway crash cushion comprising a rear section adapted for mounting to a high-resistance object, and a front section facing an anticipated direction of impact along an impact axis, the improvement comprising:

a linkage mounted to the front and rear sections to support the front section in use, said linkage comprising two side frames, each side frame comprising first and second end portions and at least one hinge, each hinge pivotable about a respective hinge axis, said hinge axes oriented when the crash cushion is in a use orientation such that said front section is supported by the linkage as the hinges pivot, said side frames remaining connected at the first end portion to the front section and at the second end portion to the rear section as the hinges pivot; and an energy-absorbing, deformable element mounted between the side frames and interposed between the front and rear sections, said energy-absorbing element compressed between the front and rear sections as the hinges pivot in a high-energy impact to decelerate the front section.

2. In a highway crash cushion comprising a rear section adapted for mounting to a high-resistance object, and a front section facing an anticipated direction of impact along an impact axis, the improvement comprising:

a linkage mounted between the front and rear sections, said linkage collapsible from an initial configuration to allow the front section to approach the rear section in an impact;

a restraint device coupled to the linkage to hold the linkage in the initial configuration, said restraint device comprising a trigger mechanism and a probe, said trigger mechanism responsive to position of the probe to release the linkage from the initial configuration in response to movement of the probe in the impact, said probe included as a part of the highway crash cushion prior to the impact.

3. In a highway crash cushion comprising a rear section adapted for mounting to a high-resistance object, and a front section facing an anticipated direction of impact along an impact axis, the improvement comprising:

a linkage mounted between the front and rear sections, said linkage collapsible from an initial configuration to allow the front section to approach the rear section in an impact;

a restraint device coupled to the linkage to hold the linkage in the initial configuration, said restraint device comprising a trigger mechanism responsive to position of a probe to release the linkage from the initial configuration in response to movement of the probe in the impact;

said trigger mechanism comprising:

a cable anchor rotatably mounted to one of the front and rear sections;

a sear movable between a restraint position, in which the sear resists rotation of the cable anchor, and a release position, in which the sear allows rotation of the cable anchor; and an actuator coupled to the sear to move the sear in response to movement of the probe.

4. The invention of claim 3 wherein the restraint device comprises a cable connected between the linkage and the cable anchor, said cable anchor configured to capture the cable when in the restraint position, and to release the cable when in the release position.

5. The invention of claim 4 further comprising a crash attenuator mounted to the front section, wherein the crash attenuator comprises the probe, and wherein the probe is positioned to engage and move the actuator in response to collapsing movement of the attenuator.

6. The invention of claim 5 wherein the crash attenuator comprises a first and second portions, wherein the first portion is more resistant to axial collapse than the second portion, and wherein the probe is coupled to the first portion.

7. The invention of claim 4 wherein the linkage comprises two side frames, wherein each side frame comprises at least one hinge, and wherein the cable is mounted to at least one of the side frames to restrain pivoting of the respective hinge.

8. The invention of claim 7 wherein the hinges are each pivotable about a respective hinge axis, and wherein said hinge axes are oriented when the crash cushion is in a use orientation such that the front section is supported by the intermediate section as the hinges pivot.

9. The invention of claim 1 or 8 wherein the hinge axes are oriented substantially vertically when the crash cushion is in the use orientation.

10. The invention of claim 1 or 8 wherein each side frame comprises first and second sub-frames, wherein each side frame comprises a rear hinge pivotably connecting the rear section to the first sub-frame, an intermediate hinge pivotably connecting the first sub-frame to the second sub-frame, and a front hinge pivotably connecting the second sub-frame to the front section, and wherein the hinge axes for the rear, intermediate and front hinges are substantially parallel.

11. The invention of claim 10 wherein the hinge axes for the rear hinges on the two side frames are separated by a first distance, wherein the hinge axes for the intermediate hinges on the two side frames are separated by a second distance, and wherein the second distance is greater than the first distance.

12. The invention of claim 10 wherein the intermediate hinges comprise abutting surfaces that substantially prevent the hinge axes for the intermediate hinges from approaching one another beyond a selected minimum separation.

13. The invention of claim 1 or 2 wherein the crash cushion comprises a support frame for attaching a crash attenuator to a vehicle, wherein the rear section is adapted for mounting to the vehicle, and wherein the front section is adapted for mounting to the attenuator.

14. The invention of claim 13 wherein the front section comprises an attenuator pivot axis and an actuator mounted to the front section to tilt the actuator between a vertical storage position and a horizontal use position.

15. The invention of claim 14 wherein the attenuator is mounted to the front section, and wherein the attenuator has an energy-absorbing capacity in excess of 530 KJ.

* * * * *